UNITED STATES PATENT OFFICE.

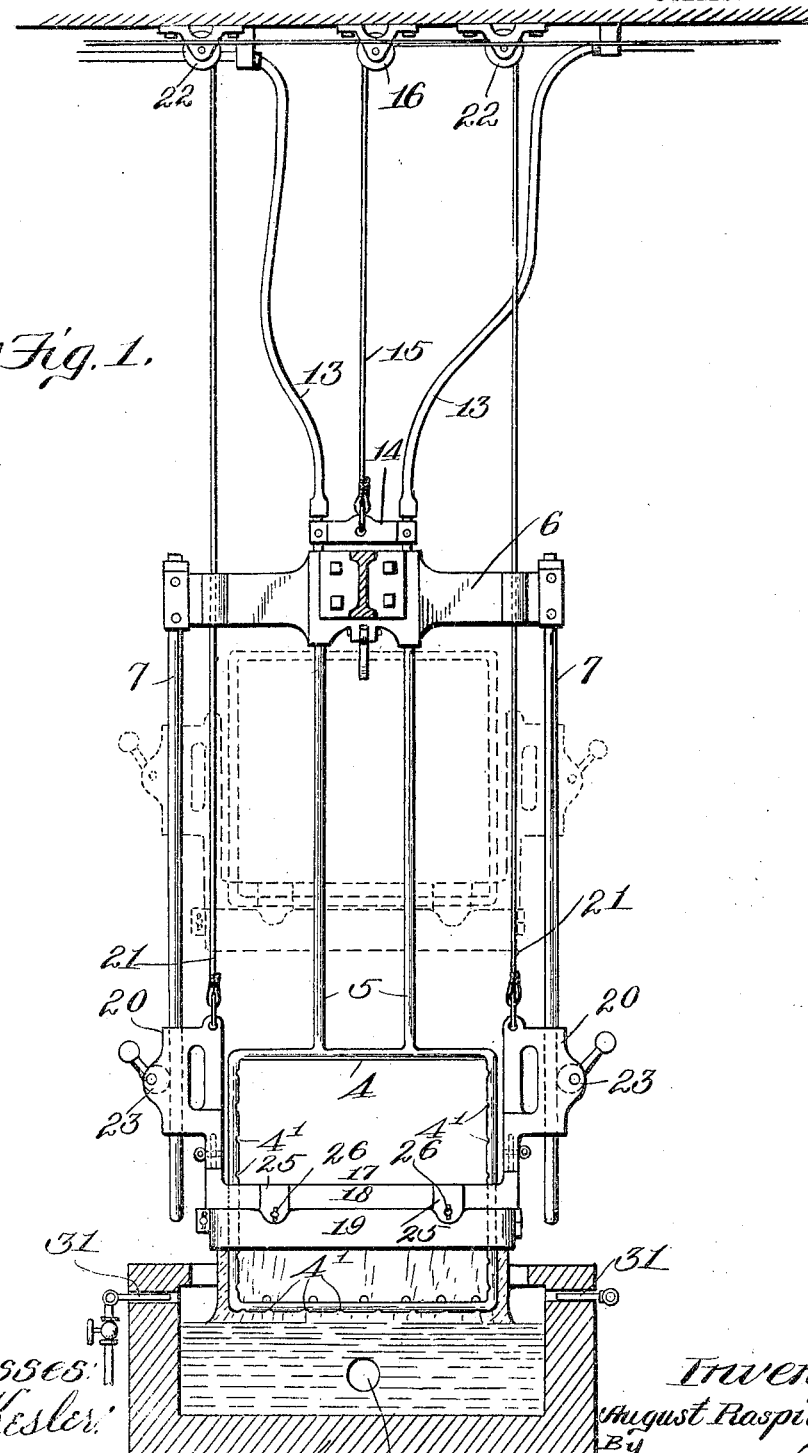

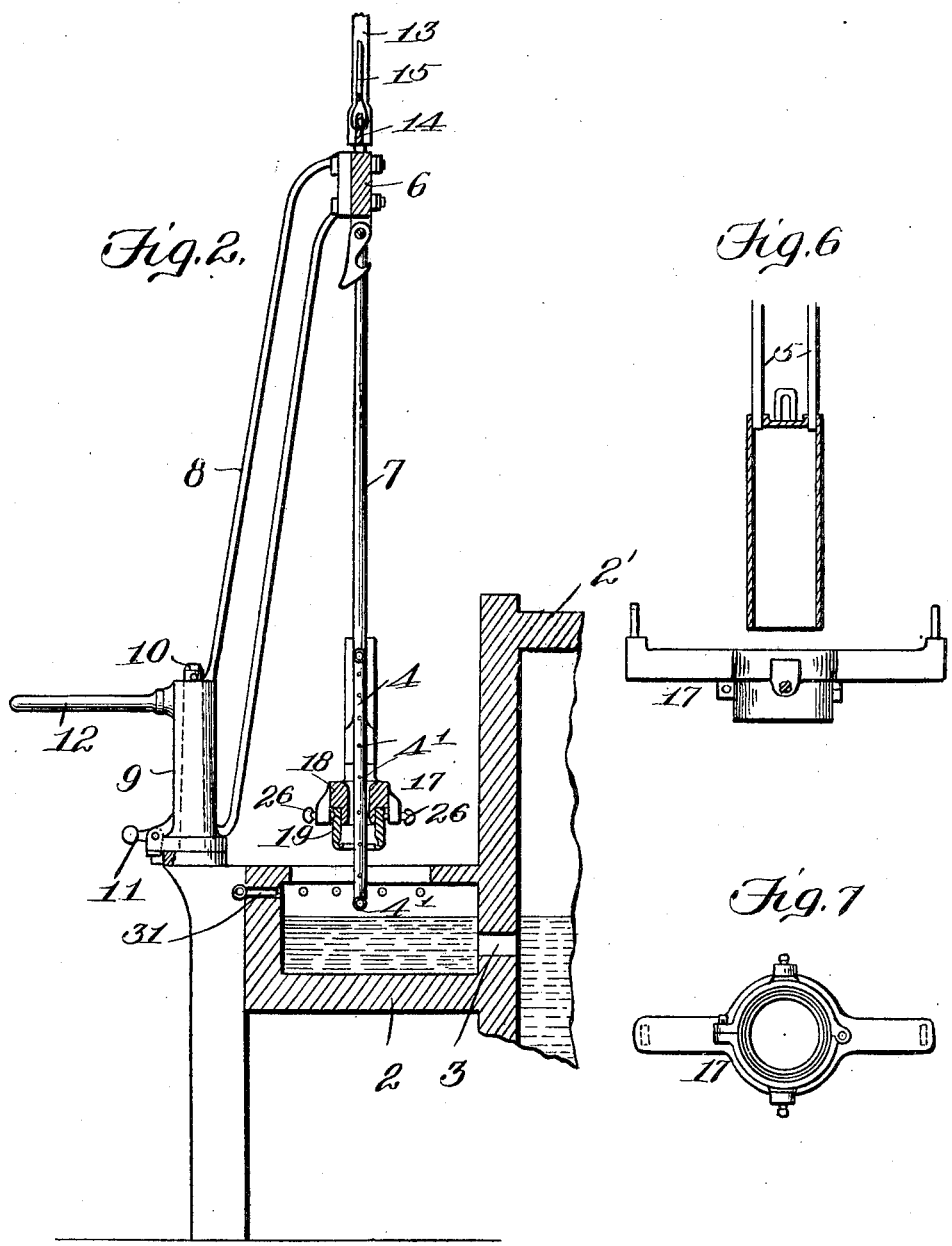

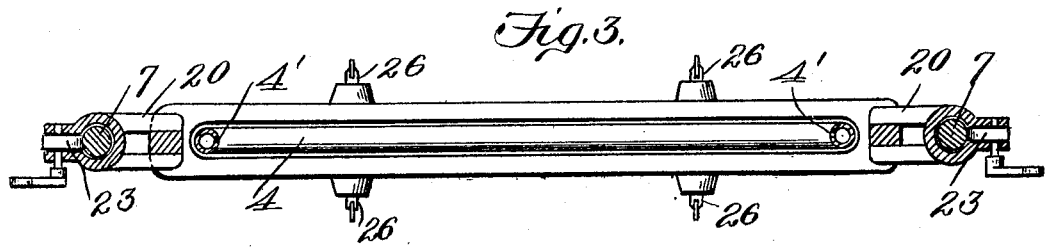
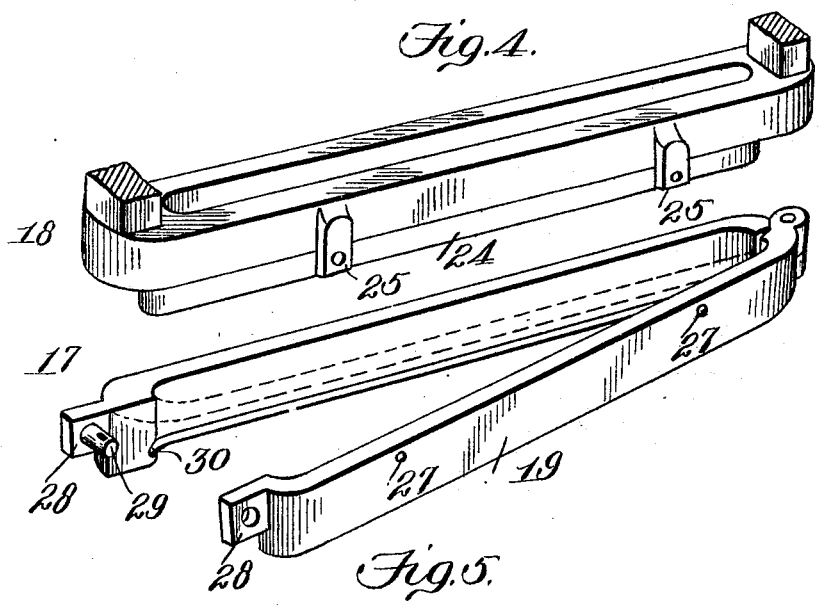
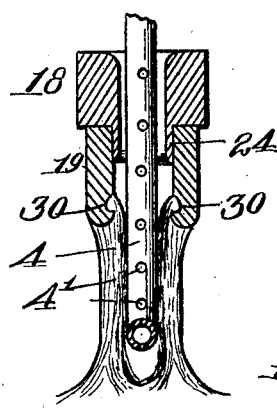

AUGUST RASPILLAIRE, OF MORGANTOWN, WEST VIRGINIA, ASSIGNOR OF TWO-THIRDS TO JOSEPH L. KEENER AND JAMES P. WARRICK, OF MORGANTOWN, WEST VIRGINIA.

MACHINE FOR MAKING GLASS ARTICLES.

No. 804,173.     Specification of Letters Patent.     Patented Nov. 7, 1905.

Application filed March 18, 1903. Serial No. 148,391.

*To all whom it may concern:*

Be it known that I, AUGUST RASPILLAIRE, a citizen of the United States, residing at Morgantown, in the county of Monongalia and State of West Virginia, have invented new and useful Improvements in Machines for Making Glass Articles, of which the following is a specification.

This invention relates to means for drawing glass, particularly in tubular form, and has for its object the coöperative combination of a core of configuration and size to impart the desired shape to the tubular "draw" and a drawing implement or bait surrounding the core and corresponding in shape and proportions to said core for drawing the glass about said core, whereby the desired shape is given to the draw.

This invention has also for its object the provision of means whereby, if desired, a lubricating and chilling agent may be discharged through the core into the draw.

To the end stated my invention consists in the features hereinafter described, and illustrated in the accompanying drawings, in which—

Figure 1 is a sectional front elevation of a machine including my invention. Fig. 2 is a sectional side elevation of the same. Fig. 3 is a plan view of a plunger constituting a part of said machine and showing guides in section for said plunger. Fig. 4 is a perspective view of the plunger, showing the head of the same detached from the body and opened. Fig. 5 is a cross-sectional elevation of the plunger and core. Fig. 6 is a sectional detail showing a modified form of plunger and core. Fig. 7 is a sectional plan view of the same.

Like characters refer to like parts throughout the several figures.

In the drawings the numeral 2 denotes the forehearth of a glass-melting tank 2' of the ordinary kind. The glass is melted in the tank and flows therefrom by means of the aperture or opening 3 into the forehearth, which latter constitutes a suitable receptacle for containing the molten glass and from which the latter can be drawn during the formation of the articles.

Referring particularly to Figs. 1 and 2, the core illustrated therein is denoted by 4, and it consists of a rectangular open or skeleton frame capable of being lowered toward or from the molten glass in the receptacle of the forehearth 2. This core is of the shape and size and proportions which it is desired to impart to the draw of glass. When it is desired that the tubular draw of glass should be of oblong form, the skeleton core will be of that form and of the proper size and proportions to accomplish that result, as shown particularly in Figs. 1, 2, and 3 of the drawings. When the draw is to be cylindrical, the core will have that shape as particularly shown in Figs. 6 and 7. It is obvious that cores of other shapes may be utilized when it is desired to draw a tube of other shape. The core represented is tubular; but it will be evident that this is not essential. When the core is tubular, a conduit may be provided therein for the passage of a fluid, which may be air. The under face of the lower cross-bar of the core 4 may have a multiplicity of perforations 4' and the side bars similar perforations on the inner faces thereof. The perforations upon the under side of the lower cross-bar of the frame will permit the escape of air, which air reduces the friction between the glass and the core at the lower end of the latter as the glass is drawn over said core. The perforations or holes in the insides of the vertical side bars of the core will permit the escape of air into the glass drawn around the core, which may be found desirable in some instances for the purpose of assisting in chilling or setting the glass. In ordinary practice, however, the glass will after it has passed above the lower cross-bar of the core be found to have been sufficiently chilled to maintain the shape or form imparted thereto by said core. From the upper side of the core the parallel pipes 5 extend vertically and slidably project through suitable bores in the cross-head 6, from the outer ends of which the parallel guides 7 depend. These pipes are preferably of smaller diameter than the pipe of the core 4 in order to prevent any contact of the glass with the same as it is drawn upward, as will hereinafter appear. Upon the forward side of the cross-head, substantially centrally thereof, is fastened the standard 8, the latter terminating at its lower end in a vertical sleeve 9, turning upon the suitably-supported spindle or shaft 10, the said sleeve being normally held against rotation by a gravity-pawl or detent 11. By lifting this detent 11 the sleeve 9, and consequently the standard 8 and parts connected therewith, can be freely turned, and in order to facilitate this operation the sleeve is provided with a handle 12. When fluid is to be circulated through the core, flexible tubes, as 13, are connected with the upper ends of the pipes 5, the one on the left of Fig. 1 constituting an inlet or supply for the fluid, which, as previously stated, is preferably air, and the other one constituting an outlet for such fluid, which, it will be obvious, circulates through the pipes 5 and also through the tubular core or frame 4. The perforations shown with which the core may be provided will permit the discharge of air for lubricating purposes, as above described. The pipes 5 above the cross-head 6 are united by the bar or plate 14, to which a cord 15 is connected, the cord extending upward therefrom and passing over a guide-pulley 16 and being connected with suitable hoisting mechanism by which said core can be raised and lowered. As such hoisting mechanism forms no part of the invention, it is not illustrated.

As will hereinafter appear, the core 4 is lowered to within a short distance of the level of the molten glass of the receptacle or forehearth 2. The said core, as shown, when lowered to within a short distance of the level of the molten body of the glass is in practical operative position to initiate and continue to completion and maintain without auxiliary means of any description the form and dimensions of draw to be effected.

I provide in connection with the core means for drawing molten glass from the receptacle and placing the same around the core, and the means illustrated for this purpose will now be set forth.

The plunger is denoted in a general way by 17, (see Fig. 4,) and it includes in its construction a body 18, having a removable head or working portion 19. This plunger is adapted to dip into the molten glass into the receptacle 2 and to be moved therefrom, and as the latter operation takes place the glass is drawn from the receptacle 2 by said plunger. The plunger 18 (shown in Figs. 1 to 5, inclusive) is adapted to surround the core 4, and its shape in cross-section corresponds to that of the core, the plunger having a close fit around said core. The body of the plunger is detachably connected at its opposite ends by suitable joints with the parallel slides 20, which travel up and down upon the parallel guides 7, which joints, being quite familiar, need not be described in detail. In fact, they may be of any desirable character. The slides 20 are located above the removable head of the plunger 19, so that when the latter is dipped into the molten glass in the receptacle 2 said slides will not be immersed therein. The two slides, which move in unison, constitute a suitable carrier for the plunger, and ropes or cords, as 21, extend upward from the same and over suitable guide-pulleys 22, supported substantially in horizontal line with the guide-pulley 16, such ropes being connected with suitable hoisting mechanism by which the plunger 17 can be readily raised and lowered. Any suitable means may be provided for this purpose.

The plunger, as will be understood, consists of a tubular frame surrounding the core and traveling up and down relatively thereto, it being evident that the core during the drawing of the glass is stationary relatively to the plunger, and for holding the plunger in a relatively stationary position the slides 20, to which the same is connected and which constitutes, in effect, a part thereof, are provided with weighted eccentrics 23, which engage the guides 7, as clearly shown in Fig. 1, to hold the plunger in a fixed position. By disengaging the eccentrics from the guides 7, which may be accomplished by the manipulation of the weighted arms of said eccentrics, the plunger may be readily raised or lowered. The body 18 has along its lower edge a rabbet or groove 24, into which the head 19 is to be set, the rabbet being of such a depth that the outer faces of the body and head when in assembled relation are nearly flush. From this it will be evident that the head of the plunger may be readily removed from the body thereof. In order to hold the body and head firmly together, the body is provided upon its opposite sides with depending perforated lugs 25, through which pins 26 may be passed to fit seats 27 in the outer faces of the plunger-head. In order to facilitate the separation of the removable plunger-head from the body of glass connected therewith, the head consists, preferably, of two complemental hinged members provided at or near their free ends with outwardly-extending ears 28, adapted when the head is in its working relation to fit face to face, one of said lugs having a projection 29 to extend through a hole in the other, such projection having an opening to receive a locking-pin, whereby the hinged sections of the head may be maintained in proper relation.

The plunger 17 has along its lower inner edge a continuous groove 30, which, it will be seen, is formed in the head portion thereof, and which groove when the plunger is immersed in the molton mass dips up the same, so that when the plunger is elevated the glass is drawn therewith and placed around the core 4, the plunger ascending to a suitable point, during which time the core is wholly surrounded by the glass, and which glass has operative contact with the core, whereby it is shaped by the core. The thickness of the lower or working edge of the plunger regulates the thickness of the glass, although this may also be secured by the speed with which said plunger is elevated. For example, by lifting the plunger slowly the glass will be thicker than if it is elevated quickly.

In operation the core 4 is lowered to within a short distance of the level of the molten glass, after which the plunger 17 is lowered into the mass and then lifted therefrom, drawing the glass therewith and carrying it around the core, which divides the body of glass and forms it into two connected parts, the contour agreeing with that of the core. When the plunger has been raised above the core a suitable distance, the tube of glass is separated from the molten mass or adjacent thereto by suitable means. This means may consist of gas-burners 31, placed in openings in the opposite sides of the forehearth and the gas flowing from which may be ignited in order that the flames therefrom will shoot toward each other and reach the glass above the level of the molten mass in order to immediately sever the connection between the glass tube and the molten mass, or the same result may be secured by increasing the speed of elevation of the plunger, so as to draw the glass thin, whereby the latter will be automatically severed. In order to permit the operatives to obtain ready access to the plunger and the tube of glass suspended therefrom after the drawing of the glass, the frame to which the plunger is connected may be swung outward away from the forehearth 2; and this operation may be accomplished through the manipulation of the handle 12, by turning which the standard 8, and hence the cross-head 6, guide 7, and parts connected therewith, can be swung from over the forehearth, the core, of course, having been previously elevated, so as to clear the upper edge of said forehearth during the turning of the plunger-carrying frame. After the turning of this frame the head 19 of the plunger is removed from the body 18 thereof by withdrawing the pins 26, following which the core will be lifted out of the tube of glass and plunger-head. The tube of glass with the plunger-head attached thereto can then be carried to an annealing-furnace by means of a crane or its equivalent (not shown) and then placed in said furnace for the purpose of annealing or toughening the glass. When the glass is annealed, it, with the plunger attached thereto, is removed from the annealing-furnace, and in order to facilitate the separation of the glass the plunger-head may be opened by removing the locking-pin from the projection 29. After the glass tube is annealed if sheets are to be made therefrom the sides of such tube can be separated from the remainder thereof by convenient means. When the core is of oblong shape, as particularly shown in Figs. 1, 2, and 3 in the drawings, and the sides of the tube drawn thereover are separated, two flat sheets will be provided without the necessity of subsequent flattening, which process of flattening is altogether eliminated. This is a very desirable consideration, because the process of flattening is a tedious and expensive one.

Referring to Figs. 6 and 7, I have shown a slightly-different arrangement for forming tubular articles of cylindrical form. The construction of the mechanism illustrated in these two last-mentioned figures is exactly like that heretofore described, except as to the shape of the plunger and core, the modified parts, as shown in said Figs. 6 and 7, being cylindrical. The operation of the modified form is also the same. When cylindrical objects are made by the modified form of mechanism, no cutting of the sides is necessary, as is the case of the first-mentioned arrangement, the tube being left in its original condition after trimming. As this modified mechanism is the same as that of the preferred form, I will employ corresponding characters to denote equivalent parts.

I provide means to hold the core elevated, the same being shown only in Figs. 1 and 2, and being represented as consisting of a pivoted hook or pawl adapted to engage said core for the purpose stated.

It will be observed that by my invention I provide a machine in which the shape of the draw may be varied at will by merely changing the shape of the core and the bait. This is radically distinguished from all prior mechanisms for mechanically drawing glass, according to which prior mechanisms a measured quantity of air just sufficient to maintain the form of the draw has to be introduced within the draw, requiring expensive machinery and nicety of manipulation, and, furthermore, according to such idea cylindrical draws only can be accomplished, whereas by my apparatus draws of different shape may be successfully accomplished.

Having thus described the invention, what is claimed as new is—

1. In a machine for mechanically drawing glass, the combination of a core about which the glass is drawn, said core having a shape corresponding to and being of proportions corresponding to the shape and proportions of a tubular sheet of glass to be drawn, and a bait surrounding said core corresponding thereto in size and outline, and means for moving the bait relatively to said core, whereby in the act of drawing the glass the core will give shape thereto without the aid of auxiliary mechanism.

2. In a machine for mechanically drawing glass, the combination of a core about which the glass is drawn, said core having a shape corresponding to and being of proportions corresponding to the shape and proportions of a tubular sheet of glass to be drawn, and a bait surrounding said core corresponding thereto in size and outline, means for moving the bait relatively to said core, whereby in the act of drawing the glass the core will give shape thereto without the aid of auxiliary mechanism, and means for circulating a cooling medium through the core.

3. In a machine for mechanically drawing glass, the combination of a perforated core about which the glass is drawn, said core having a shape corresponding to and being of proportions corresponding to the shape and proportions of a tubular sheet of glass to be drawn, and a bait surrounding said core corresponding thereto in size and outline, means for moving the bait relatively to said core whereby in the act of drawing the glass the core will give shape thereto without the aid of auxiliary mechanism, and means for circulating a cooling medium through the core.

4. In a machine for mechanically drawing glass, a core, said core having a shape corresponding to and being of proportions corresponding to the shape and proportions of the tubular sheet of glass to be drawn, whereby in the act of drawing the glass the core will give shape thereto as it is being drawn without the aid of auxiliary mechanism, and whereby the shape of the draw will be determined by the shape of the core.

5. In a machine for mechanically drawing glass, a core, said core having a shape corresponding to and being of proportions corresponding to the shape and proportions of the tubular sheet of glass to be drawn, whereby in the act of drawing the glass core will give shape thereto as it is being drawn without the aid of auxiliary mechanism, and whereby the shape of the draw will be determined by the shape of the core combined with means for circulating a cooling medium through the core.

In testimony whereof I have hereunto set my hand in presence of two subscribing witnesses.

AUGUST RASPILLAIRE.

Witnesses:
BRYAN GORDON,
THONEY PIETRO.